(12) United States Patent
Takeuchi

(10) Patent No.: US 8,165,420 B2
(45) Date of Patent: Apr. 24, 2012

(54) NOISE REDUCTION CIRCUIT AND IMAGE PROCESSING DEVICE

(75) Inventor: Satoru Takeuchi, Shijyonawate (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1160 days.

(21) Appl. No.: 11/959,521

(22) Filed: Dec. 19, 2007

(65) Prior Publication Data

US 2008/0152222 A1 Jun. 26, 2008

(30) Foreign Application Priority Data

Dec. 26, 2006 (JP) .................................. 2006-350167

(51) Int. Cl.
*G06K 9/00* (2006.01)
*G06K 9/40* (2006.01)
(52) U.S. Cl. ......... 382/275; 382/167; 382/260; 382/274
(58) Field of Classification Search .................. None
See application file for complete search history.

(56) References Cited

U.S. PATENT DOCUMENTS

| | | | | | |
|---|---|---|---|---|---|
| 4,281,295 | A | * | 7/1981 | Nishimura et al. | 333/14 |
| 5,294,925 | A | * | 3/1994 | Akagiri | 341/50 |
| 5,598,482 | A | * | 1/1997 | Balasubramanian et al. | 382/199 |
| 5,911,012 | A | * | 6/1999 | Bernard et al. | 382/260 |
| 6,204,891 | B1 | * | 3/2001 | Florent | 348/616 |
| 6,341,294 | B1 | * | 1/2002 | Yoshida | 715/201 |
| 6,493,387 | B1 | * | 12/2002 | Shin et al. | 375/240.1 |
| 6,556,210 | B1 | * | 4/2003 | Yamamoto et al. | 345/582 |
| 6,650,790 | B1 | * | 11/2003 | Arbeiter et al. | 382/275 |
| 6,771,833 | B1 | * | 8/2004 | Edgar | 382/254 |
| 6,879,732 | B1 | * | 4/2005 | Sokolov | 382/275 |
| 6,894,666 | B2 | * | 5/2005 | Otawara et al. | 345/77 |
| 6,907,144 | B1 | * | 6/2005 | Gindele | 382/275 |
| 7,079,702 | B2 | * | 7/2006 | Watanabe et al. | 382/274 |

(Continued)

FOREIGN PATENT DOCUMENTS

JP 2000-295497 10/2000

(Continued)

OTHER PUBLICATIONS

Hiroyuki Kondo et al., "Colored Face Image Processing by Vector E-filter—Removal of Wrinkles-", Institute of Electronics, Information, and Communication Engineers, NII—Electronic Library Service, p. 143.

(Continued)

*Primary Examiner* — Michelle Entezari
(74) *Attorney, Agent, or Firm* — Marvin A. Motsenbocker; Mots Law, PLLC

(57) ABSTRACT

A representative-value calculator calculates a representative value of signal values of pixels included in each of divided regions of a neighboring region of a pixel of interest. The divided regions are obtained by dividing the neighboring region into the predetermined number of divisions. The number of divisions is determined based on a frequency band in an input image signal. A difference-absolute-value calculator calculates a difference absolute value between a signal value of the pixel of interest and each of the representative values of the respective divided regions. A weight calculator calculates a weight for each of the representative values of the respective divided regions according to the difference absolute value. A normalization processor normalizes the sum of products of the representative values of the respective divided regions and the weights for the representative values of the respective divided region.

8 Claims, 6 Drawing Sheets

U.S. PATENT DOCUMENTS

| | | | |
|---|---|---|---|
| 7,453,504 B2 * | 11/2008 | Ikeda | 348/252 |
| 8,031,967 B2 * | 10/2011 | Zhang et al. | 382/275 |
| 2004/0076237 A1 * | 4/2004 | Kadono et al. | 375/240.29 |
| 2005/0162531 A1 * | 7/2005 | Hsu et al. | 348/222.1 |
| 2006/0274386 A1 * | 12/2006 | Wakazono et al. | 358/518 |
| 2007/0009167 A1 * | 1/2007 | Dance et al. | 382/254 |
| 2007/0081729 A1 * | 4/2007 | Ogawa | 382/209 |
| 2007/0097267 A1 * | 5/2007 | Sakurai et al. | 348/571 |

FOREIGN PATENT DOCUMENTS

JP    2006-014024    1/2006

OTHER PUBLICATIONS

C. Tomasi et al., "Bilateral Filtering for Gray and Color Images", Proceedings of the 1998 IEEE International Conference on Computer Vision, Bombay, India.

* cited by examiner

| C0,0 | C0,1 | C0,2 | C0,3 | C0,4 | C0,5 | C0,6 |
|------|------|------|------|------|------|------|
| C1,0 | C1,1 | C1,2 | C1,3 | C1,4 | C1,5 | C1,6 |
| C2,0 | C2,1 | C2,2 | C2,3 | C2,4 | C2,5 | C2,6 |
| C3,0 | C3,1 | C3,2 |      | C3,4 | C3,5 | C3,6 |
| C4,0 | C4,1 | C4,2 | C4,3 | C4,4 | C4,5 | C4,6 |
| C5,0 | C5,1 | C5,2 | C5,3 | C5,4 | C5,5 | C5,6 |
| C6,0 | C6,1 | C6,2 | C6,3 | C6,4 | C6,5 | C6,6 |

TARGET PIXEL (C3,3)

NUMBER OF DIVISIONS: 16  2x2

NUMBER OF DIVISIONS: 4  4x4

FIG. 7

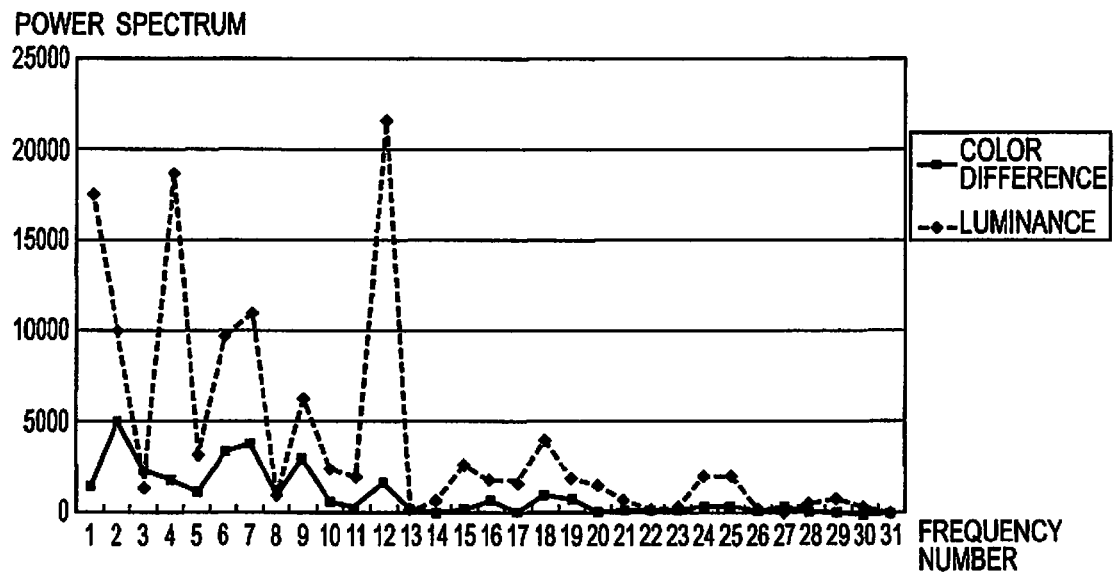

FIG. 8

FORMULA OF ONE-DIMENSIONAL FOURIER TRANSFORM $$F(u) = \sum_{x=0}^{M-1} f(x) e^{-2\pi i \left(\frac{ux}{M}\right)}$$

$$= \sum_{x=0}^{M-1} f(x) \left( \cos 2\pi \left(\frac{ux}{M}\right) + i \sin 2\pi \left(\frac{ux}{M}\right) \right)$$

DEFINITIONAL EQUATION OF POWER SPECTRUM $$P(u) = \left( \sum_{x=0}^{M-1} f(x) \left( \cos 2\pi \left(\frac{ux}{M}\right) \right) \right)^2 + \left( \sum_{x=0}^{M-1} f(x) \left( \sin 2\pi \left(\frac{ux}{M}\right) \right) \right)^2$$

THE GRAPH OF ONE-DIMENSIONAL POWER SPECTRUM IS SYMMETRICAL WITH RESPECT TO THE ORIGIN (E.G., THE FOLLOWING IS THE RESULT OBTAINED BY OPERATING THE FFT ON EIGHT POINTS, AND IS SYMMETRICAL WITH RESPECT TO P(4) AS THE ORIGIN: P(1)=P(7); P(2)=P(6); P(3)=P(5))

| P(0) | P(1) | P(2) | P(3) | P(4) | P(5) | P(6) | P(7) |

NOISE REDUCTION CIRCUIT AND IMAGE PROCESSING DEVICE

CROSS REFERENCE TO RELATED APPLICATIONS

This application claims priority based on 35 USC 119 from prior Japanese Patent Application No. P2006-350167 filed on Dec. 26, 2006, the entire contents of which are incorporated herein by reference.

BACKGROUND OF THE INVENTION

1. Field of the Invention

The present invention relates to a noise reduction circuit and an image processing device.

2. Description of the Related Art

To reduce a noise included in an image, heretofore, it has been common to use an average filter which takes an average of a signal value of a denoising target pixel (hereinafter, referred to as a "pixel of interest"), and signal values of pixels (hereinafter, referred to as "neighboring pixels") in the neighborhood of the pixel of interest. However, the average filter has a problem of blurring a significant edge (contour, pattern) included in an image. To solve the problem, $\epsilon$-filter, bilateral filter, and the like have been proposed. Each filter gives a weight (calculates a filter coefficient) to each neighboring pixel according to the absolute value of the difference (hereinafter referred to as a difference absolute value) between the signal value of the pixel of interest and the signal value of the neighboring pixel. For $\epsilon$-filter, see, for example, Kondo Hiroyuki, Hanari Kenji, Shimizu Katsuhide, and Arakawa Kaoru, "Colored Face Image Processing by Vector $\epsilon$-Filter: Removal of Wrinkles" in Proceedings of the IEICE General Conference, 1998, D-11-143 (March, Heisei 10 (1998) (Non-patent document 1)). For bilateral filter, see, for example, Tomasi, C. and Manduchi R., "Bilateral filtering for gray and color images" in Proc. Of International Conference on Computer Vision, IEEE 1998, pp. 839-846 (Non-patent document 2).

Here, a neighboring region is defined by the number of horizontal and vertical filter taps. For example, there are eight neighboring pixels excluding the pixel of interest in the filter of 3×3 taps.

$\epsilon$-filter is expressed as follows:

$$y(n) = \sum_{k=-N}^{N} a_k [x(n) - f\{x(n) - x(n-k)\}] \quad \text{Equation (1)}$$
$$= \sum_{k=-N}^{N} a_k x'(n-k)$$

$$x'(n-k) = \begin{cases} x(n-k): & |x(n) - x(n-k)| \le \varepsilon \\ x(n): & |x(n) - x(n-k)| > \varepsilon \end{cases} \quad \text{Equation (2)}$$

where x(n) indicates an input signal, y(n) indicates an output signal, and 2N indicates the number of taps $a_k$, the summation of which is set to 1.

$\epsilon$-filter requires nonlinear circuits (difference-absolute-value calculation, filter coefficient calculation) as many as the number obtained by subtracting 1 from the number of pixels existing in the neighboring region. This produces a problem that, as the number of filer taps becomes larger, the circuit size increases. Against this problem, for example, Japanese Patent Application Laid-open Publication No. 2000-295497 (JP-A No. 2000-295497) discloses a method using a filter configured of only nonlinear circuits for an average value of all the pixels within taps, and a signal value of a pixel of interest.

Furthermore, in order to decrease the occurrence of a phenomenon referred to as a "ghost" in which a fake contour appears at a position spaced a little away from an edge when the method in JP-A No. 2000-295497 is employed, Japanese Patent Application Laid-open Publication No. 2006-14024 (JP-A No. 2006-14024), for example, discloses a method which is simplified by limiting, to 0 or 1, weights given to neighboring pixels without decreasing the number of nonlinear circuits.

However, in the case of the method using a difference absolute value of the average value of all the pixels within taps as in JP-A No. 2000-295497, some combination of the frequency band of a signal included in an input image signal, and the number of filter taps may cause a blur in an image after denoising, and a ghost around edges in the image.

Furthermore, in the simplified method described in JP-A No. 2006-14024, a weight calculation process (difference calculation, threshold comparison) is performed for all the pixels included in filter taps. Accordingly, in the case where the number of taps is large, and where the band of a signal included in an input image signal is narrow, the process is redundant.

SUMMARY OF THE INVENTION

An aspect of the invention provides a noise reduction circuit that comprises a representative-value calculator configured to calculate a representative value of signal values of pixels included in each of divided regions of a neighboring region of a pixel of interest, the divided regions obtained by dividing the neighboring region by the predetermined number of divisions, the number of divisions determined based on a frequency band in an input image signal, a difference-absolute-value calculator configured to calculate a difference absolute value between a signal value of the pixel of interest and each of the representative values of the respective divided regions, a weight calculator configured to calculate a weight for each of the representative values of the respective divided regions according to the difference absolute value, a sum-of-product operation circuit configured to perform a sum-of-product operation on the representative values of the respective divided regions calculated by the representative-value calculator, and the weights for the representative values of the respective divided regions calculated by the weight calculator, and a normalization processor configured to normalize the sum of products calculated by the sum-of-product operation circuit, and configured to output the normalized data.

Another aspect of the invention provides an image processing device that comprises an demosaic circuit configured to receive an input image signal, and generate RGB signals for each pixel; a matrix transformer configured to receive the RGB signals, and generate a luminance signal and color difference signals through a matrix operation, a luminance noise reducer configured to receive the luminance signal and reduce noise of the received luminance signal, a contour extractor configured to apply a high pass filter to the luminance signal to generate a contour signal, an adder configured to add the luminance signal reduced noise by the luminance noise reducer and contour signal generated by the contour extractor, and a color difference noise reducer configured to receive color difference signals and reduce noise of the received difference signals, wherein at least one of the luminance noise reducer and the color difference noise reducer comprises, a representative-value calculator configured to calculate a representative value of signal values of pixels included in each of divided regions of a neighboring region of a pixel of interest, the divided regions obtained by dividing the neighboring region by the predetermined number of divisions, the number of divisions determined based on a frequency band in an input image signal, a difference-absolute-value calculator configured to calculate a difference absolute value between a signal value of the pixel of interest and each of the representative values of the respective divided regions, a weight calculator configured to calculate a weight for each of the representative values of the respective divided regions according to the difference absolute value, a sum-of-product operation circuit configured to perform a sum-of-product operation on the representative values of the respective divided regions calculated by the representative-value calculator, and the weights for the representative values of the respective divided regions calculated by the weight calculator, and a normalization processor configured to normalize the sum of products calculated by the sum-of-product operation circuit, and configured to output the normalized data.

BRIEF DESCRIPTION OF THE DRAWINGS

FIG. 7 is a view showing frequency components of a luminance signal and a color difference signal of the embodiment.

FIG. 8 is a view for describing the definitions of a one-dimensional FFT and power spectrum of the embodiment.

DETAILED DESCRIPTION OF THE PREFERRED EMBODIMENTS

Figure 1:
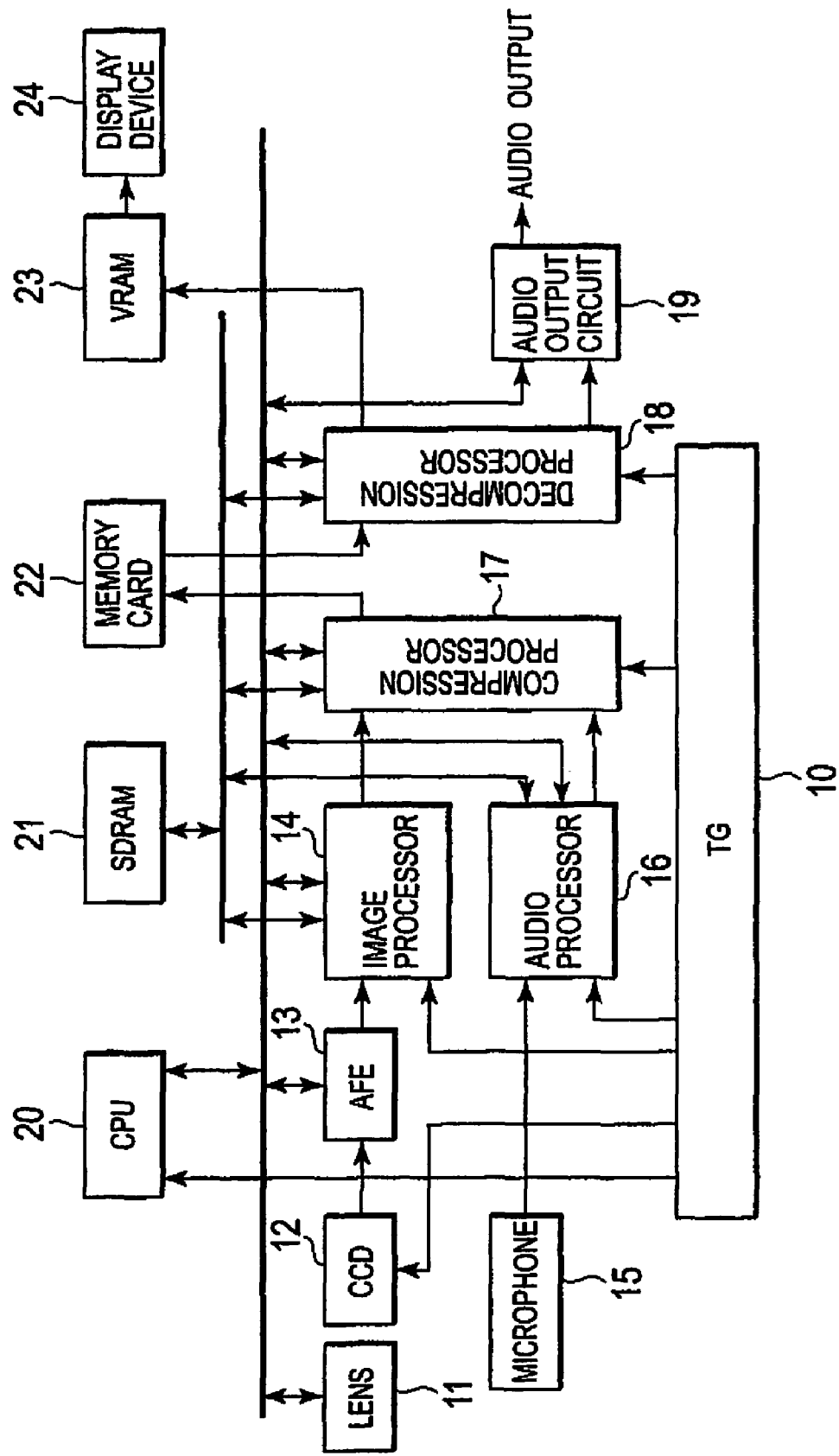
FIG. 1 is a circuit block diagram of an image display device of an embodiment.

Hereinafter, an embodiment of the present invention will be described with reference to the accompanying drawings. In the following drawings, the same or similar reference numerals and symbols are used to designate the same or similar components. It should be noted that the drawings are schematic.

(Configuration of Image Display Device)

An image displaying device of this embodiment will be described using a digital camera as an example thereof. FIG. 1 is a view showing a circuit configuration of the digital camera of this embodiment.

The digital camera of this embodiment includes TG 10, lens 11, CCD 12, AFE (Analog Front End) 13, image processor 14, microphone 15, audio processor 16, compression processor 17, decompression processor 18, audio output circuit 19, CPU 20, SDRAM 21, memory card 22, VRAM 23, and display device 24.

TG 10 generates timing control signals (Vsync, Hsync) of the entire circuit, and a CCD drive pulse.

Lens 11 forms an optical image of a subject on CCD 12. CCD 12 is an element which performs photoelectric conversion, and the element is called as a CCD image sensor. In addition, a CMOS sensor may be also used. AFE 13 is a circuit which converts an analog signal from CCD 12, into a digital signal. AFE 13 performs a gain control according to the level of a signal from CCD 12.

Image processor 14 generates three pieces of information on a luminance signal (Y), a difference (U) between a luminance signal and a blue color component, and a difference (V) between a luminance signal and a red color component, from an input image signal transmitted from CCD 12 through AFE 13. Furthermore, after noises of the luminance signal (Y) and color-difference signals (U, V) thus generated are reduced, image processor 14 outputs the information to compression processor 17. The detailed description of image processor 14 will be given later.

Microphone 15 converts a sound into an electric signal. Audio processor 16 converts the audio analog signal into a digital signal. Compression processor 17 is a circuit which compresses the image/audio signal. Compression processor 17 compresses both a moving image and a still image. Decompression processor 18 decompresses the image/audio signal thus compressed. Audio output circuit 19 converts the decompressed audio signal into an analog signal, and outputs the analog signal.

CPU 20 controls the entire circuit. To be more specific, CPU 20 controls AF (Auto Focus) and AE (Auto Exposure) on lens 11 according to detected data of image processor 14. In addition, CPU 20 performs a gain control on AFE 13.

SDRAM 21 is a memory which temporarily stores data during signal processing. Memory card 22 is a nonvolatile memory that records a still image and a moving image. VRAM 23 is a memory (storing device) of a video display part for a display. Display device 23 displays graphics written into VRAM 23.

(Configuration of Image Processing Device)

Figure 2:
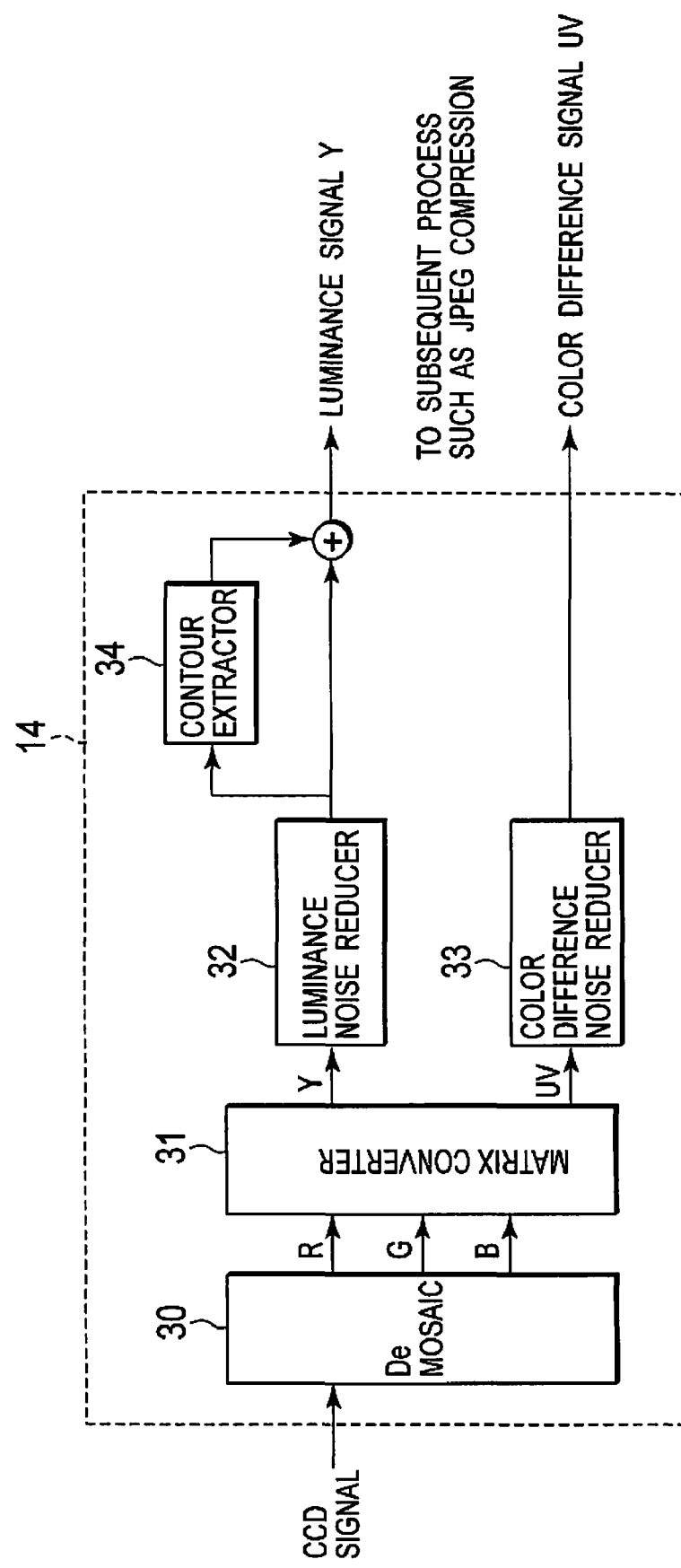
FIG. 2 is a functional block diagram of an image processor shown in FIG. 1.

Next, image processor 14 (image processing device) will be described in detail with reference to FIG. 2.

Image processor 14 includes Demosaic 30, matrix converter 31, luminance noise reducer 32, color difference noise reducer 33, and contour extractor 34.

When Demosaic 30 is a single-plate sensor, an input image signal for each pixel is any one of signals of R (red), G (green), and B (blue), so that Demosaic 30 generates an RGB signal for each pixel by an interpolation process.

Matrix converter 31 generates a luminance signal (Y signal) and color difference signals (U signal and V signal) from the RGB signal through a matrix operation. Matrix converter 31, for example, generates a YUV signal from the RGB signal using the following conversion equations of ITU-R BT.601 (International Standard in which a data format has been established, which is used for converting an analog video signal into digital data):

$$Y = 0.299 \times R + 0.587 \times G + 0.114 \times B$$

$$U = -0.169 \times R - 0.331 \times G + 0.500 \times B$$

$$V = 0.500 \times R - 0.419 \times G - 0.081 \times B.$$

Luminance noise reducer 32 generates an output signal in which a noise of a luminance signal is removed. Color difference noise reducer 33 generates an output signal in which a noise of a color difference signal is removed. The detailed description of luminance noise reducer 32 and color difference noise reducer 33 will be given later.

Contour extractor 34 applies a high pass filter to a luminance signal to generate a contour signal. The output signals from luminance noise reducer 32 and contour extractor 34 are added, so that a luminance signal Y is generated.

Subsequently, the detailed description of luminance noise reducer 32 and color difference noise reducer 33 will be given.

Luminance noise reducer 32 and color difference noise reducer 33 give a weight to pixels in the neighborhood of the pixel of interest, according to a difference absolute value between a signal value of a pixel of interest, and a signal value of a pixel included in the neighborhood of the pixel of interest, and thereafter performs a sum-of-product process and a normalization process thereon, and thereby outputs a signal in which a noise is reduced.

The size (the number of filter taps) of the neighboring region is determined according to the standard deviation of noises included in an input image, and the target standard deviation after the noise reduction. The larger the difference of standard deviations between before and after the noises are removed, the larger the size of the neighboring region is set. In addition, the size of the neighboring region is determined in advance according to the difference between standard deviations before and after the noises are removed.

Figure 3:
FIG. 3 is a view for describing a neighboring region of the embodiment.
Figure 4:
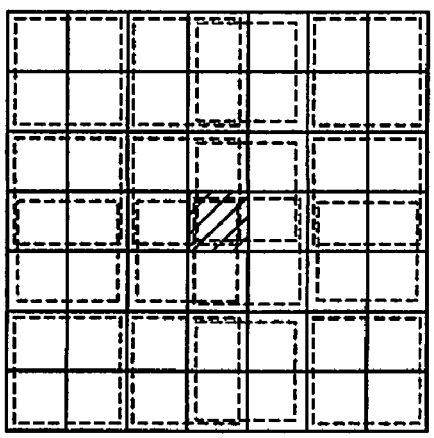
FIG. 4 is a view for describing a process by a luminance noise reducer of the embodiment.
Figure 5:
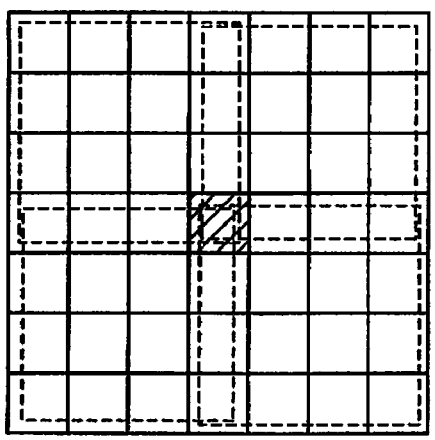
FIG. 5 is a view for describing a process by a color difference noise reducer of the embodiment.

Hereinafter, this embodiment will be described on the basis that the neighboring region is of 7 pixels×7 pixels as shown in FIG. 3. In FIG. 3, the signal value of the pixel of interest is set to be $C_{3,3}$, and the signal values of neighboring pixels in the neighboring region of the pixel of interest are set to be $C_{0,0}$ to $C_{6,6}$. Furthermore, as shown in FIG. 4 or FIG. 5, the neighboring region is divided in advance into a plurality of regions. The number of divisions of the neighboring region is determined according to a frequency band in an input image signal. Specifically, as the amount of high-frequency components in an input image signal is smaller, the neighboring region is divided by a smaller number of divisions. For example, suppose a case where the frequency number of 16 or larger is considered to be a high-frequency component. In this case, as shown in FIG. 7, a luminance signal Y includes a large number of high-frequency components, and color difference signals U, V include a small number of high-frequency components. Accordingly, the neighboring regions for the color difference signals are divided by a smaller number of divisions than that of the neighboring region for the luminance signal.

In a graph shown in FIG. 7, plotted is a power spectrum except the DC component, which has been obtained by operating a one-dimensional FFT (Fast Fourier Transform) on 64 points. The definitions of the FFT and the power spectrum are shown in FIG. 8. In addition, a larger frequency number represents a higher frequency. Since the graph of one-dimensional power spectrum is symmetrical with respect to the origin, 31 points have been plotted in FIG. 7.

As described above, since the neighboring region for the color difference signal is divided by a smaller number of divisions than that of the neighboring region for the luminance signal, color difference noise reducer 33 uses the neighboring region divided by a smaller number of divisions than that of the neighboring region used by luminance noise reducer 32. For example, luminance noise reducer 32 uses the neighboring region divided by the number of divisions of 16 as shown in FIG. 4, while color difference noise reducer 33 uses the neighboring region divided by the number of divisions of 4 as shown in FIG. 5. FIG. 4 shows an example in which the number of divided regions each being composed of 2×2 pixels is 16. FIG. 5 shows an example in which the number of divided regions each being composed of 4×4 pixels is 4.

(Configuration of Noise Reduction Circuit)

Next, circuit configurations of luminance noise reducer 32 and color difference noise reducer 33 will be described with reference to FIG. 6. Here, referring to the example of the configuration of color difference noise reducer 33, described is color difference noise reducer 33 which uses the neighboring region shown in FIG. 3 under the condition that the neighboring region is divided as shown in FIG. 5.

Figure 6:
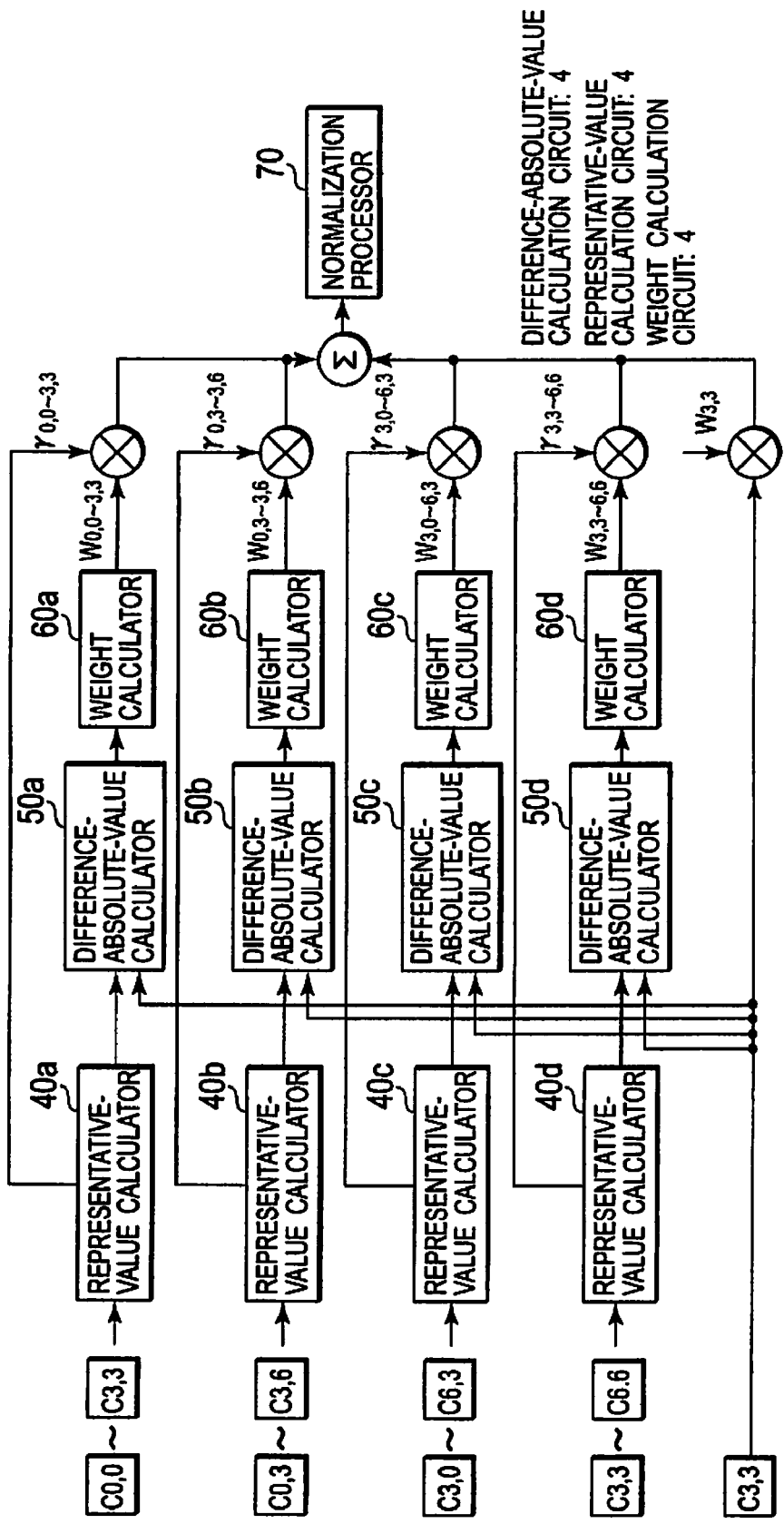
FIG. 6 is a functional block diagram of the color difference noise reduction unit shown in FIG. 2.

As shown in FIG. 6, color difference noise reducer 33 includes representative-value calculators 40a, 40b, 40c and 40d, difference-absolute-value calculators 50a, 50b, 50c and 50d, weight calculators 60a, 60b, 60c and 60d, and normalization processor 70.

For each one of divided regions into which the neighboring region is divided, representative-value calculators 40a, 40b, 40c and 40d each calculates the representative value of signal values of pixels included in the divided region. Specifically, representative-value calculator 40a calculates the average value of signal values of 16 pixels $C_{0,0}$ to $C_{3,3}$ as the representative value $r_{0,0\sim3,3}$. In the same way, representative-value calculator 40b calculates the average value of signal values of 16 pixels $C_{0,3}$ to $C_{3,6}$ as the representative value $r_{0,3\sim3,6}$. Furthermore, representative-value calculator 40c calculates the average value of signal values of 16 pixels $C_{3,0}$ to $C_{6,3}$ as the representative value $r_{3,0\sim6,3}$. Still furthermore, representative-value calculator 40d calculates the average value of signal values of 16 pixels $C_{3,3}$ to $C_{6,6}$ as the representative value $r_{3,3\sim6,6}$. Instead of using the average value as the representative value, the median value may be used. For instance, when the average value is used, the representative value of $C_{0,C}$ to $C_{3,3}$ is given by $(C_{0,C}+C_{0,1}+C_{0,2}+C_{0,3}+C_{1,0}+C_{1,1}+C_{1,2}+C_{1,3}+C_{2,0}+C_{2,1}+C_{2,2}+C_{2,3}+C_{3,0}+C_{3,1}+C_{3,2}+C_{3,3})/16$.

Difference-absolute-value calculators 50a, 50b, 50c and 50d each calculates the difference absolute value between a signal value of the pixel of interest and the representative value of each divided region calculated by each of representative-value calculators 40a, 40b, 40c and 40d. Specifically, difference-absolute-value calculator 50a calculates the difference absolute value between the representative value $r_{0,3\sim3,6}$ calculated by representative-value calculator 40a and the signal value $C_{3,3}$ of the pixel of interest. In the same way, difference-absolute-value calculator 50b calculates the difference absolute value between the representative value $r_{0,3\sim3,6}$ calculated by representative-value calculator 40b and the signal value $C_{3,3}$ of the pixel of interest. Furthermore, difference-absolute-value calculator 50c calculates the difference absolute value between the representative value $r_{3,0\sim6,3}$ calculated by representative-value calculator 40c and the signal value $C_{3,3}$ of the pixel of interest. Still furthermore, difference-absolute-value calculator 50d calculates the difference absolute value between the representative value $r_{3,3\sim6,6}$ calculated by representative-value calculator 40d and the signal value $C_{3,3}$ of the pixel of interest.

Weight calculators 60a, 60b, 60c and 60d each calculate a weight for the representative value of each divided region according to the difference absolute value calculated by each of difference-absolute-value calculators 50a, 50b, 50c and 50d. Specifically, weight calculator 60a calculates the weight $W_{0,0\sim3,3}$ for the representative value $r_{0,0\sim3,3}$ according to the difference absolute value calculated by difference-absolute-value calculator 50a. Similarly, weight calculator 60b calculates the weight $W_{0,3\sim3,6}$ for the representative value $r_{0,3\sim3,6}$ according to the difference absolute value calculated by difference-absolute-value calculator 50b. Furthermore, weight calculator 60c calculates the weight $W_{3,0\sim6,3}$ for the representative value $r_{3,0\sim6,3}$ according to the difference absolute value calculated by difference-absolute-value calculator 50c. Still furthermore, weight calculator 60d calculates the weight $W_{3,3\sim6,6}$ for the representative value $r_{3,3\sim6,6}$ according to the difference absolute value calculated by difference-absolutevalue calculator 50d. As a specific calculation method of weight, for example, the weight $W_{0,0-3,3}$ for the representative value $r_{0,0-3,3}$ of $C_{0,0}$ to $C_{3,3}$ is obtained by the following equation on the basis of Non-patent document 2:

$$W_{0,0-3,3} = \exp(-|C_{3,3-0,0} - r_{0,0-0,3}|^2/2\sigma^2) \quad \text{Equation (3)}$$

where σ denotes a parameter to adjust the intensity of noise removal. As σ increases, the noise removal effect increases, but the edge is blurred.

Normalization processor 70 normalizes the sum of products of the representative values of the respective divided regions calculated by representative-value calculators 40a, 40b, 40c and 40d, and the weights for the representative values of the respective divided regions calculated by weight calculators 60a, 60b, 60c and 60d. Then, normalization processor 70 outputs the result obtained by the normalization process as an output signal. In the normalization process, the sum of products is divided by the sum of the weights by which the signals have been multiplied so that the DC components of the signal inputted in color difference noise reducer 33 and of the signal to be outputted from color difference noise reducer 33 can become constant. As an example, when all the weights take the value of 1, in the normalization process, the division is performed by the number of pixels which exist in taps. The normalization process in FIG. 6 is expressed by the following equation:

$$(W_{0,0-3,3} \times r_{0,0-3,3} + W_{0,3-3,6} \times r_{0,3-3,6} + W_{3,0-6,3} \times r_{3,0-6,3} + W_{3,3-6,6} \times r_{3,3-6,6})/(W_{0,0-3,3} + W_{0,0-3,6} + W_{3,0-6,3} + W_{3,3-6,6}) \quad \text{Equation (4)}.$$

While the configuration of color difference noise reducer 33 has been described above, luminance noise reducer 32 has almost the same configuration as that of color difference noise reducer 33. The different point between luminance noise reducer 32 and color difference noise reducer 33 is the numbers of representative-value calculators, difference-absolute-value calculators, and weight calculators. When luminance noise reducer 32 uses the neighboring region shown in FIG. 3 and when this neighboring region is divided as shown in FIG. 4, it is necessary to have representative-value calculators, difference-absolute-value calculators, and weight calculators, the numbers of the calculators being the same as the number of divisions, respectively. Accordingly, luminance noise reducer 32 has 16 calculators for the representative-value calculators, difference-absolute-value calculators, and weight calculators, respectively.

The description above has been given assuming that the calculators (representative-value calculators, difference-absolute-value calculators, and weight calculators) of luminance noise reducer 32 and color difference noise reducer 33 are configured as nonlinear circuits, and the respective circuits (representative-value calculation circuits, difference-absolute-value calculation circuits, and weight calculation circuits) are disposed in advance according to the number of divisions of the neighboring region. However, instead of using the nonlinear circuits, the representative-value calculators, difference-absolute-value calculators, weight calculators, and normalization processor may come into operations by programs. In this case, luminance noise reducer 32 and color difference noise reducer 33 are configured by process controllers (CPUs) in which a representative-value calculation module, a difference-absolute-value calculation module, a weight calculation module, and a normalization processing module can be embedded in the CPUs. These modules can be realized by executing a dedicated program to use a predetermined program language in a general-purpose computer such as a personal computer. Furthermore, when processes are performed by the program, it is possible to perform, in luminance noise reducer 32 and color difference noise reducer 33, the processes in which the number of divisions of a neighboring region is determined, and in which the neighboring region is divided, so that the number of divided neighboring regions is the same as the number of divisions thus determined. In this case, the dividing process is performed in real time, so that the processing time can be shortened.

When giving a weight according to the difference absolute value between a signal value of a pixel of interest and a signal value of a neighboring pixel, a general conventional nonlinear filter performs a difference-absolute-value calculation process on each of neighboring pixels. For example, in the case of the neighboring region shown in FIG. 3, a representative-value calculation process, a difference-absolute-value calculation process, and a weight calculation process are performed on each of $C_{0,0}$ to $C_{6,6}$, so that it is necessary to have 48 circuits for the representative value calculation circuits, difference-absolute-value calculation circuits, and weight calculation circuits, respectively.

The noise reduction circuits (luminance noise reducer 32 and color difference noise reducer 33) of this embodiment use the neighboring region which is divided by the number of divisions determined according to the amount of high-frequency components in an input image signal. Accordingly, the numbers of representative-value calculation circuits, difference-absolute-value calculation circuits, and weight calculation circuits can be reduced. For example, for luminance noise reducer 32 described above, the numbers of representative-value calculation circuits, difference-absolute-value calculation circuits, and weight calculation circuits are respectively 16, while those for color difference noise reducer 33 are 4. In this manner, in this embodiment, the numbers of the respective circuits can be changed according to the amount of high-frequency components, and thereby the number of circuits can be reduced. This enables the scaling-down of nonlinear circuits.

Furthermore, using the noise reduction circuits of this embodiment, the number of divisions of a neighboring region is changed according to the amount of high-frequency components, whereby the edge blurring and ghost can be suppressed. This point will be described in detail below.

Figure 9:
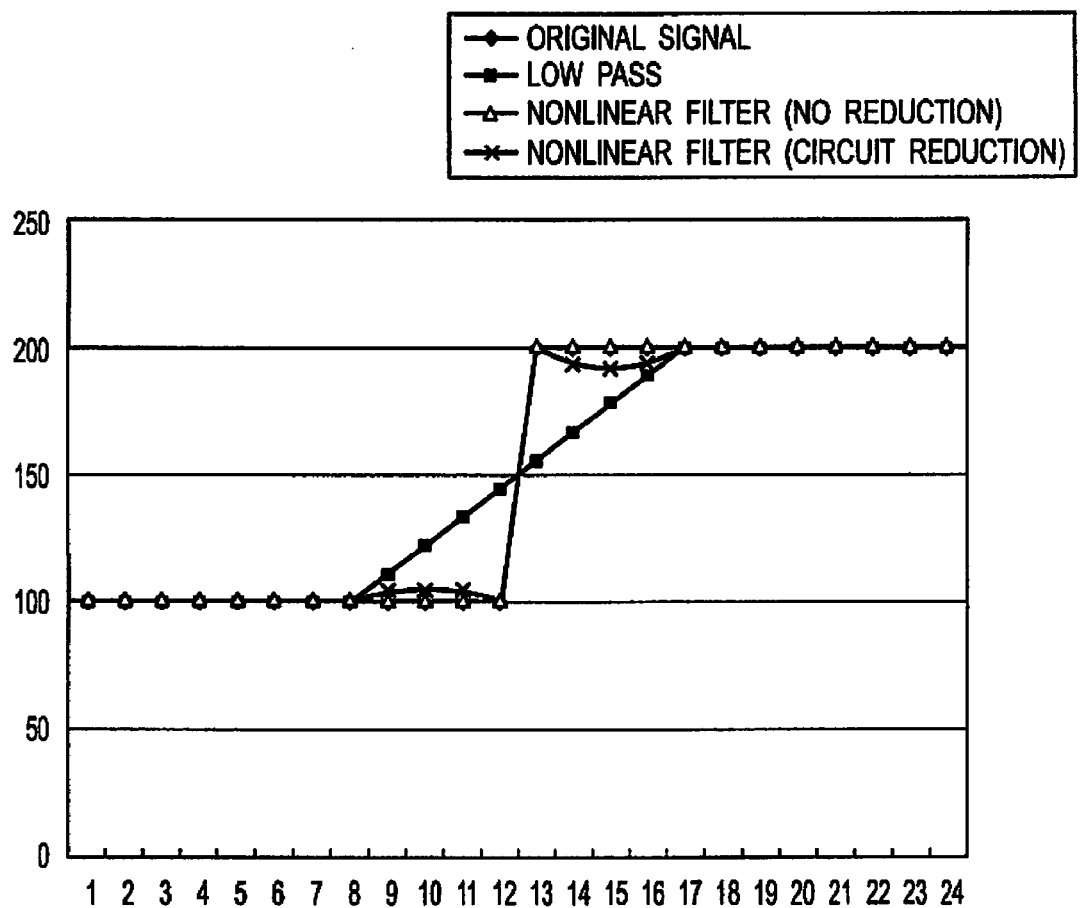
FIG. 9 is a view for describing edge blurring and ghost in a conventional filter.

FIG. 9 is a graph showing an input image signal (original signal in FIG. 9) and output image signals using various filters. Here, nine pixels are set as a neighboring region.

In a low pass filter, the neighboring nine pixels including the pixel of interest are averaged. As shown in FIG. 9, in the case of the low pass filter, edge blurring occurs. The edge blurring is a phenomenon in which a gradient of a signal, supposedly large, becomes small. For example, on an image of a digital camera, the edge blurring means the blurring on a contour.

Furthermore, a nonlinear filter (circuit reduction) performs a difference-absolute-value calculation process on the average value of the neighboring eight pixels of the pixel of interest. As shown in FIG. 9, in the case of the nonlinear filter (circuit reduction), an edge is stored, but a ghost occurs on a position spaced away from the edge. The ghost is a phenomenon in which a signal, supposedly represented in a straight line, is represented in an inward curve. For example, on an image of a digital camera, the ghost means a shade in the vicinity of a contour. Thus, when the number of divisions of a neighboring region is uniformly made too small, the ghost may occur.

In this embodiment, instead of using the averaging and average values of all the neighboring pixels, the number of divisions of a neighboring region is changed according to the amount of high-frequency components, so that the edge blurring and ghost can be suppressed.

Furthermore, a nonlinear filter (no reduction) performs a difference-absolute-value calculation process on all the neighboring eight pixels. As shown in FIG. 9, in the case of the nonlinear filter (no reduction) also, it is possible to suppress the edge blurring and ghost. However, in this case, it is necessary to have the representative-value calculation circuits, difference-absolute-value calculation circuits, and weight calculation circuits, the numbers of these circuits being the same as the number of neighboring pixels, respectively. This results in an increase of a circuit size. As described above, in this embodiment, the numbers of the respective circuits are changed according to the amount of high-frequency components, and thereby the number of circuits can be reduced. This enables the scaling-down of nonlinear circuits.

In this embodiment, as the amount of high-frequency components in an input image signal is smaller, the neighboring region is divided by a smaller number of divisions. Thus, the smaller the amount of high-frequency components, the smaller the number of divisions is made. Thereby, it is possible to reduce the numbers of representative-value calculation circuits, difference-absolute-value calculation circuits, and weight calculation circuits, respectively.

Furthermore, a neighboring region for a color difference signal is divided by a smaller number of divisions than that of a neighboring region for a luminance signal. The color difference signal includes a small amount of high-frequency components, compared with that of the luminance signal, so that the neighboring region for the color difference signal is divided by the number of divisions being smaller than that of the neighboring region for the luminance signal. Thereby, it is possible to reduce the numbers of representative-value calculation circuits, difference-absolute-value calculation circuits, and weight calculation circuits.

Other Embodiment

It is to be understood that the present invention is not limited to the above descriptions and drawings constituting a part of this disclosure. From this disclosure, various alternative embodiments, examples and operation thereof will be obvious to those skilled in the art.

For example, the above-described embodiment, describes that a neighboring region is divided by a smaller number of divisions as the amount of high-frequency components in an input image signal is smaller. As an example thereof, a neighboring region for a color difference signal may be divided by a smaller number of divisions than that of a neighboring region for a luminance signal. The embodiment of the present invention is not limited to this. Alternatively, for example, neighboring regions for R, B signals may be divided by a smaller number of divisions than that of a neighboring region for a G signal.

It is further understood that, in the above-described embodiment, although the description has been given using a digital camera as an example of an image display device, other image display devices such a digital video camera and a cellular phones may be used.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A noise reduction circuit, comprising:
   a representative-value calculator configured to calculate a representative value of signal values of pixels included in each of a plurality of divided regions of a neighboring region of a pixel of interest, the divided regions obtained by dividing the neighboring region by the predetermined number of divisions, the number of divisions determined based on a frequency band in an input image signal;
   a difference-absolute-value calculator configured to calculate a difference absolute value between a signal value of the pixel of interest and each of the representative values of the respective divided regions;
   a weight calculator configured to calculate a weight for each of the representative values of the respective divided regions according to the difference absolute value;
   a sum-of-product operation circuit configured to perform a sum-of-product operation on the representative values of the respective divided regions calculated by the representative-value calculator, and the weights for the representative values of the respective divided regions calculated by the weight calculator; and
   a normalization processor configured to normalize the sum of products calculated by the sum-of-product operation circuit, and configured to output the normalized data.

2. The noise reduction circuit of claim 1, wherein the neighboring region is divided by a smaller number of divisions as the amount of high-frequency components in the input image signal is smaller.

3. The noise reduction circuit of claim 2, wherein the neighboring region for a color difference signal is divided by a smaller number of divisions than that of the neighboring region for a luminance signal.

4. The noise reduction circuit of claim 1, wherein the noise reduction circuit is a color difference noise reducer that receives a color difference signal as the input image signal and that reduces a color difference noise.

5. The noise reduction circuit of claim 1, wherein the noise reduction circuit is a luminance noise reducer that receives a luminance signal as the input image signal, and which reduces a luminance noise.

6. An image processing device, comprising:
   a demosaic circuit configured to receive an input image signal, and generate RGB signals for each pixel;
   a matrix transformer configured to receive the RGB signals, and generate a luminance signal and color difference signals through a matrix operation;
   a luminance noise reducer configured to receive the luminance signal and reduce noise of the received luminance signal;
   a contour extractor configured to apply a high pass filter to the luminance signal to generate a contour signal;
   an adder configured to add the luminance signal reduced noise by the luminance noise reducer and contour signal generated by the contour extractor; and
   a color difference noise reducer configured to receive color difference signals and reduce noise of the received difference signals,
   wherein at least one of the luminance noise reducer and the color difference noise reducer comprises:
      a representative-value calculator configured to calculate a representative value of signal values of pixels included in each of a plurality of divided regions of a neighboring region of a pixel of interest, the divided regions obtained by dividing the neighboring region by the predetermined number of divisions, the number of divisions determined based on a frequency band in an input image signal;

a difference-absolute-value calculator configured to calculate a difference absolute value between a signal value of the pixel of interest and each of the representative values of the respective divided regions;

a weight calculator configured to calculate a weight for each of the representative values of the respective divided regions according to the difference absolute value;

a sum-of-product operation circuit configured to perform a sum-of-product operation on the representative values of the respective divided regions calculated by the representative-value calculator, and the weights for the representative values of the respective divided regions calculated by the weight calculator; and a normalization processor configured to normalize the sum of products calculated by the sum-of-product operation circuit, and configured to output the normalized data.

7. The image processing device as claimed in claim 6, wherein the neighboring region is divided by a smaller number of divisions as the amount of high-frequency components in the input image signal is smaller.

8. The image processing device as claimed in claim 6, wherein the number of divisions of the neighboring region for the color difference signal in the color difference noise reducer is smaller than that of the neighboring region for the luminance signal in the luminance noise reducer.

* * * * *